United States Patent [19]

Strehler et al.

[11] Patent Number: 5,048,626
[45] Date of Patent: Sep. 17, 1991

[54] DRIVE SYSTEM FOR AN INDUSTRIAL VEHICLE, IN PARTICULAR FOR A PEDESTRIAN CONTROLLED FORKLIFT

[75] Inventors: Richard Strehler, Chieming; Wilhelm Schwibach, Munich, both of Fed. Rep. of Germany

[73] Assignee: Carl Hurth Maschinen- und Zahnradfabrik GmbH & Co., Munich, Fed. Rep. of Germany

[21] Appl. No.: 530,852

[22] Filed: May 30, 1990

[30] Foreign Application Priority Data

Jun. 1, 1989 [DE] Fed. Rep. of Germany ....... 3917831

[51] Int. Cl.[5] .......................... B60K 7/00; B62D 51/04
[52] U.S. Cl. .................................. 180/19.2; 180/214; 180/65.6
[58] Field of Search ............... 180/19.1-19.3, 180/211, 213, 214, 65.1, 65.5, 65.6, 351; 188/78

[56] References Cited

U.S. PATENT DOCUMENTS

| | | | |
|---|---|---|---|
| 2,592,091 | 4/1952 | Weaver | 180/214 |
| 3,211,248 | 10/1965 | Quayle | 180/211 |
| 3,223,192 | 12/1965 | Dorion et al. | 180/9.2 |
| 3,800,898 | 4/1974 | Griffin | 180/65.5 |
| 4,461,367 | 7/1984 | Eichinger et al. | 180/252 |
| 4,616,730 | 10/1986 | Strehler et al. | 180/253 |

Primary Examiner—Richard A. Bertsch
Assistant Examiner—Victor E. Johnson
Attorney, Agent, or Firm—Flynn, Thiel, Boutell & Tanis

[57] ABSTRACT

A drive system for an industrial vehicle which consists substantially of an electric motor, a two-step transmission and a drive wheel and can be pivotally mounted for movement about a vertical axis in the undercarriage of the industrial vehicle. An axis of the electric motor is arranged parallel with respect to the drive wheel. The transmission can be a two-step spur gearing or a combined toothed belt and spur gearing. A swivel bearing is arranged above the drive wheel, the external race of which swivel bearing is received in the gear housing and the internal race of which swivel bearing is mounted onto a swivel pin extending downwardly from the undercarriage, the axis of said swivel pin lying at least approximately in the center rotational plane of the drive wheel, with the electric motor projecting above the area of the undercarriage having the swivel pin. A blocking brake is housed in the drive system, either as a spring-storage brake, which is integrated into the driven gear or rather the second toothed pulley of the first transmission step.

7 Claims, 2 Drawing Sheets

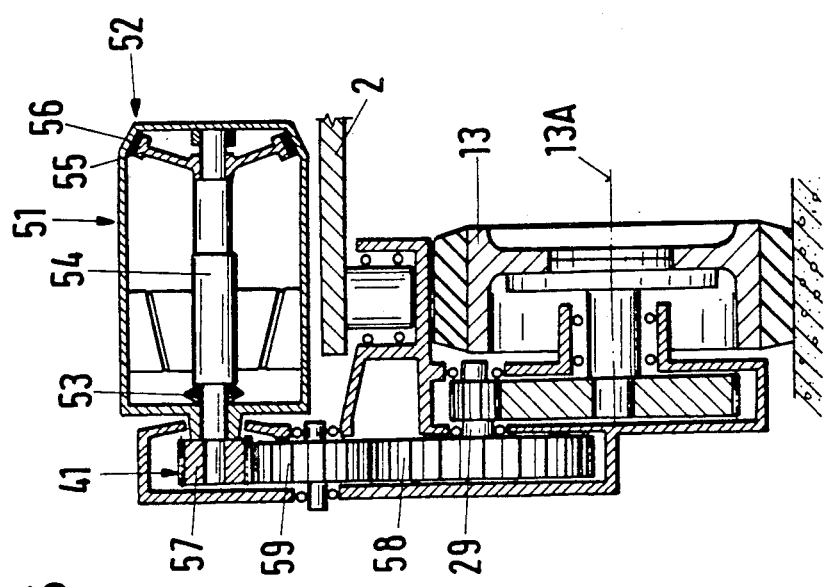
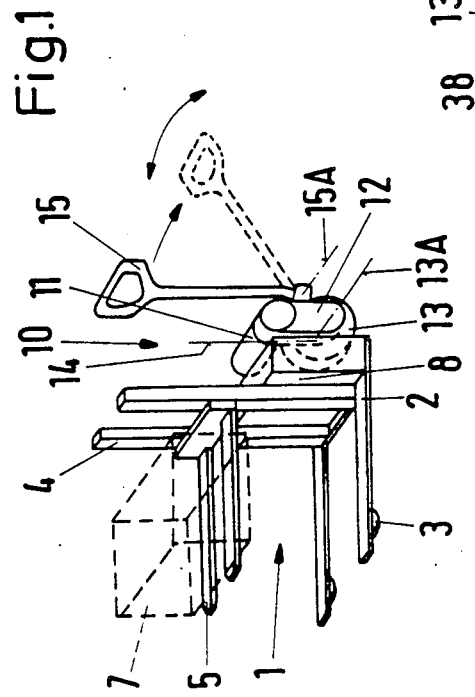
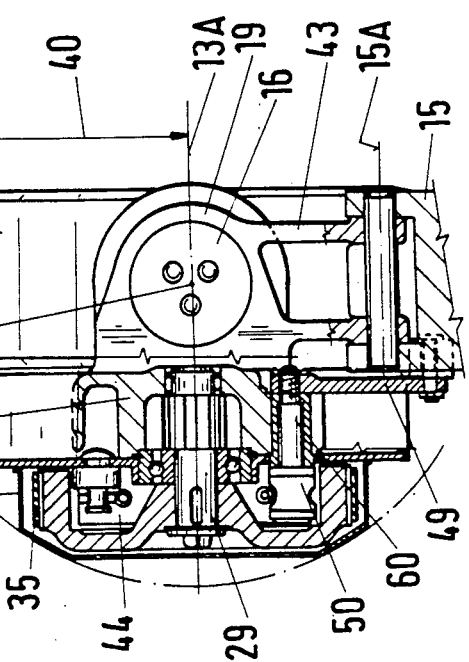

DRIVE SYSTEM FOR AN INDUSTRIAL VEHICLE, IN PARTICULAR FOR A PEDESTRIAN CONTROLLED FORKLIFT

FIELD OF THE INVENTION

The invention relates to a drive system for an industrial vehicle, which consists substantially of an electric motor, a two-step transmission and a drive wheel, and can be mounted pivotally about a vertical axis on the undercarriage of the industrial vehicle, with the drive member of the first transmission step being mounted on the driven shaft of the electric motor and the driven member of the second transmission shaft being mounted on a horizontal driven shaft, the one end of which projects out of the gear housing and has the drive wheel mounted thereon.

BACKGROUND OF THE INVENTION

Such a drive system is known, among others, from DE 31 33 027 C2 (corresponds to U.S. Pat. No. 4,461,367). The two-step transmission is in this known design designed as a spur-gear bevel-gear transmission. The electric motor is thereby mounted coaxially with the swivel axis on the gear housing and a swivel bearing pivotally receiving the gear housing on the under-carriage of the industrial vehicle surrounds the electric motor.

This type of construction has proven to be very successful for industrial vehicles like forklift trucks and the like. The relatively high expenses for the swivel bearing must thereby be tolerated. The known construction is too expensive for vehicles with a lower performance, as for example pedestrian controlled forklifts.

Also the reaction moment acting from the drive onto the steering is disadvantageous in these vehicles, which must be steered manually with a pole.

SUMMARY OF THE INVENTION

Therefore, the basic purpose of the invention is to provide an inexpensive swivel bearing and a drive system of the above-mentioned type, in which the driving energy is not transmitted through the swivel bearing, that is, a reaction moment does not act from the drive onto the steering.

The purpose is attained with a drive system
wherein an axis of the electric motor is arranged parallel with respect to an axis of the driven shaft,
wherein the driven member of the first transmission step is mounted on a pinion shaft of the second transmission step, which pinion shaft is supported in the gear housing, and
wherein above the drive wheel there is arranged a swivel bearing, the external race of the swivel bearing being received in the gear housing and the internal race of which being mounted on a swivel pin extending downwardly from the undercarriage, an axis of the swivel pin lying at least approximately in the center rotational plane of the drive wheel, with the electric motor projecting above the area of the undercarriage whereat the swivel pin is located.

Reaction moments caused by the drive do not act onto the steering in the case of the drive system of the invention because of the shafts which are arranged parallel to one another (drive shaft of the electric motor, pinion shaft, driven shaft). Also, the driving energy is not transmitted through the swivel bearing so that a larger dimension than needed for its actual task is not necessary.

In order to keep the outer circle, thus the available space needed by the drive system when pivoting about the vertical swivel axis, as small as possible, the axes of rotation of the electric motor and of the drive wheel and the swivel axis lie at least approximately in one plane.

The first transmission step can be designed as a spur-gear step or as a chain or belt drive transmission, with the latter being advantageously designed as a toothed-belt drive. The toothed belt is not only advantageous with respect to the abatement of noise but it enables, with toothed pulleys having a smaller diameter than is possible with gears, the bridging of the center distance which depends on various factors. Since the toothed-belt drive is not lubricated, a light sheet metal cover is sufficient, which in connection with the small diameters is advantageous for the aforementioned outer circle. Under this aspect must also be viewed the measure of providing a grease lubrication for the second transmission step, because the sealing surfaces required otherwise for oil lubrication would need additional space and would enlarge the outer circle.

In order to change the translation of the first transmission step, it is sufficient to use another drive member (pinion or first toothed pulley), the driven member and, if necessary, the toothed belt can remain unchanged when the electric motor is mounted on a rocker arm and the center distance can be varied in this manner.

BRIEF DESCRIPTION OF THE DRAWINGS

The invention will be described hereinafter in connection with two exemplary embodiments, which are illustrated in five figures. More specifically:

FIG. 1 illustrates a pedestrian controlled forklift, to which the drive system of the invention can be applied;

FIG. 4 is a cross-sectional view taken approximately along the line IV—IV; and

FIG. 5 illustrates a simplified version of a modification of the embodiment according to FIG. 2.

DETAILED DESCRIPTION

Figure 3:
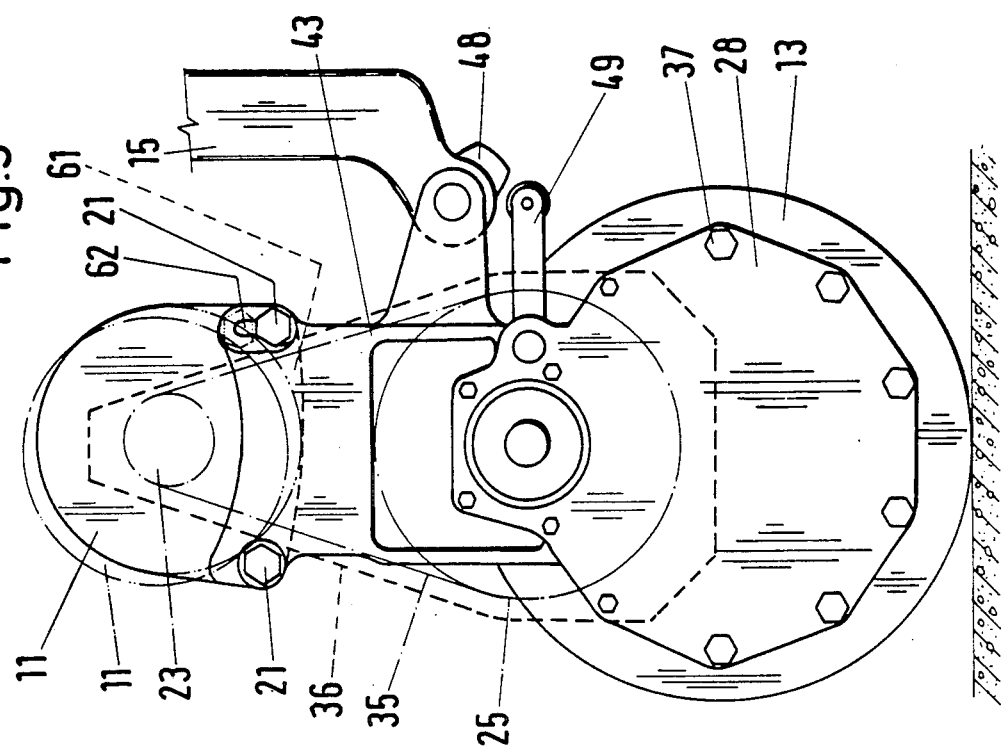
FIG. 3 is a side view in direction of the arrow III.

FIG. 1 illustrates as an example of an industrial vehicle a so-called pedestrian controlled forklift 1. Its undercarriage 2 has mounted thereon a drive system 10 which is pivotal about a vertical axis 14 and consists substantially of an electric motor 11, a transmission 12 and a drive wheel 13. A pole 15 is arranged on the drive system 10, with which pole 15 one person can steer the forklift and which pole 15 can pivot about an axis 15A which is parallel with respect to the axis 13A of the drive wheel 13. The pole acts in the illustrated vertical upright position to engage a blocking brake (not illustrated), and when the pole 15 is inclined to the vertical (dashed contour), namely, in the "travelling" position, the brake is released. Aside from the drive wheel 13, two not steerable rollers 3 are also provided on the undercarriage. A lifting post 4 is arranged on the undercarriage 2 and a lifting fork 5 for receiving a load 7 is elevationally movably guided on the lifting post. The devices needed for this are, just like the battery for the electric motor 11, stored under a hood 8.

Figure 2:
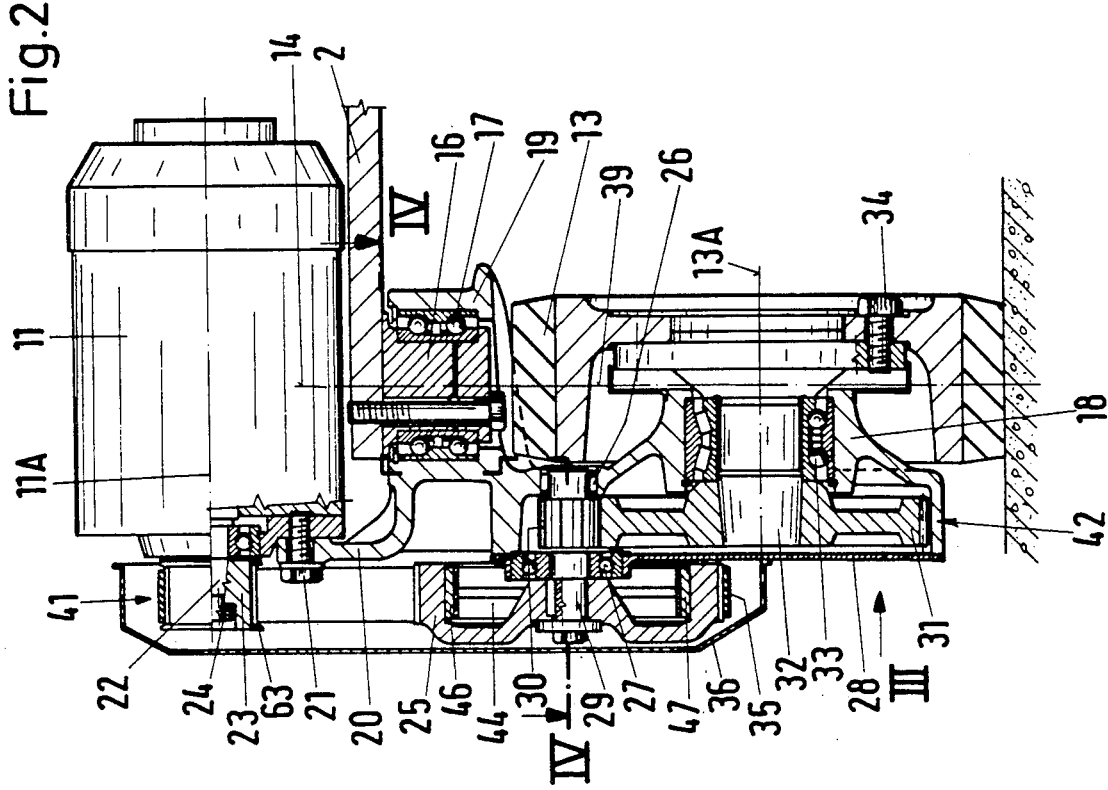
FIG. 2 is a longitudinal cross-sectional view of a drive system of the invention.

The drive system 10 is illustrated in FIGS. 2 to 4. A downwardly extending two-part swivel pin 16 is screwed or otherwise fastened as by screws to the undercarriage 2 and supports the inner race of a swivel bearing 17. The gear housing 18 is provided with a cup-shaped cap 19 which is adapted to receive therein the outer race of the swivel bearing 17. A gear housing 18 and thus the entire drive unit 10 is pivotally supported for movement about the vertical swivel axis 14 on the undercarriage 2 by the swivel bearing 17. The swivel axis 14 lies for geometrical steering reasons at least approximately in a center rotational plane 39 of the drive wheel 13. A support arm 20 projects upwardly from the gear housing 18 or rather from the cap 19. The electric motor 11 is fastened to the support arm 20 by screws 21.

A first toothed pulley 23 is mounted onto the driven shaft 22 of the electric motor 11 and is held axially nonmovably and fixed against relative rotation with respect to the shaft 22 by a nut 24. A second toothed pulley 25 is fixedly mounted on a pinion shaft 29, that is, the pulley 25 is held axially nonmovably and fixed against relative rotation with respect to the shaft 29. The shaft 29 is rotatably supported by means of roller bearings 26, 27 in the gear housing 18 and in an end shield 28. A pinion 30 on the pinion shaft mates with a spur gear 31 mounted on a driven shaft 32. The spur gear 31 is also held axially nonmovably and fixed against relative rotation with respect to the shaft 32. The driven shaft 32 is rotatably supported in the gear housing 18 by means of a roller bearing 33. An end of the shaft 32 remote from the spur gear 31 projects from the gear housing 18 and has the drive wheel 13 fastened thereto by screws 34.

The first toothed pulley 23 and the second toothed pulley 25 are connected by a toothed belt 35. These parts together form a first transmission step 41 for which lubrication is not required. To prevent damage and coarse dirt from affecting these parts and to protect the person operating the pedestrian controlled forklift 1, a light-weight metal cover 36 is provided, which cover is fastened to an end shield 28 and/or to the gear housing 18.

The pinion 30 and the spur gear 31 together form a second transmission step 42, for which grease lubrication is provided. Thus, space-requiring sealing surfaces, such as for an oil lubrication system, are not required so that the end shield 28 can also be made of sheet metal. Screws 37 are provided for fastening the end shield to the housing.

The compact design of the drive system 10 and the utilization of the space-saving end shield 28 and the metal cover 36 cause an outer circle or theoretical cylinder radius 38 of a cylinder encircling the drive wheel and the gear housing 18 and cover 36 to be only slightly greater than the radius 40 of the drive wheel 13. More specifically, the radius 38 of the theoretical cylinder is greater than the radius 40 of the drive wheel by an amount that is less than one fifth (1/5) of the radius of said drive wheel. Because of this virtually optimum outer circle, handling of the pedestrian controlled forklift 1 or use of an industrial vehicle equipped with the drive system 10 of the invention is made easier. The outer circle is not negatively influenced when—as illustrated in FIGS. 2 and 3—the motor axis 11A, the swivel axis 14 and the axis 13A of the drive wheel 13 lie in a vertical plane.

The roller bearing 33 of the driven shaft 32 is a two-row ball-roller bearing or conical-roller bearing in an O-arrangement. (FIG. 2 shows below the axis 13A the one and above the axis 13A the other design.) This type of support guarantees a problemless installation and a high degree of stability. As a rule, the same bearing can be used for the swivel bearing 17, which is advantageous for procurement, storage, installation and spare parts storage.

The translation of the first transmission step 41 can be simply changed by exchanging the first toothed pulley 23 for one with a different number of teeth. The second toothed pulley 25 and the toothed belt 35 can remain unchanged. To bridge the then modified perimeter distance to enable a continued use of the belt 35, a type of a rocker arm 61 illustrated in FIG. 3 is provided for fastening the electric motor 11 on the support arm 20. Of the two screws 21, the one on the left serves as fulcrum about which the electric motor 11 can be swung out of its illustrated position. In order to make this possible, a slotted hole 62 is provided in the support arm 20 for the screw shown on the right. The electric motor 11 is fixed in the pivoted position in the usual manner by tightening the screws 21.

A forklike pole bearing block 43 is cast on the gear housing 18, in which block the pole 15 is pivotally mounted for movement about the axis 15A which is parallel to the axis 13A. The drive system 10 can be pivoted about the vertical swivel axis 14 by means of the pole 15 and thus the vehicle can be steered. The pole 15 can also be utilized as a "brake lever" for facilitating an engaging of a blocking brake 44 constructed as a spring-loaded drum brake. The principle of such spring-storage brakes is known (for example from H. Ernst: Die Hebezeuge, Publishing House Friedr. Vieweg & Sohn, 1965, Volume I, Pages 105/106), for which reason the blocking brake 44 is not illustrated in all details. The second toothed pulley 25 is simultaneously designed as a brake drum against which act two braking jaws 46, 47 under the action of a spring (not illustrated).

To release the blocking brake 44, the pole 15 is moved from the vertically aligned position into a position inclined to the vertical (dashed contour in FIG. 1). A cam 48 on the pole 15 presses thereby onto a lever 49 rotatably supported in the gear housing 18. The lever 49 is fixedly connected to a rotatable operating shaft 60 having thereon an element 50 acting against the spring upon rotation of the shaft 60 in response to a rotatable movement of the lever 49.

A brushless direct-current motor or a frequency-controlled alternating-current motor can be used as the electric motor 11.

A modification is illustrated in FIG. 5, where a sliding rotor motor 51 with an integrated cone-pulley brake 52 is used in place of the electric motor 11 and the blocking brake 44. Sliding rotor motors are also known (supra, pages 132/133), for which reason it is only schematically illustrated. In the case of a currentless motor 51, a spring 53 presses the motor shaft 54 together with the rotor and the braking cone 55 like in FIG. 5 to the right against a corresponding braking surface 56 in the motor housing. As soon as the motor 51 has been turned on (the respective switches are —just as in the electric motor 11—arranged on the handle of the pole 15, however, they are not illustrated), the conical rotor is pulled to the left by the magnetic action of the also conically constructed stator winding such that the cone-pulley brake 52 is released. The axial movability of the rotor and thus the motor shaft 54 requires the sliding rotor motor 51 to be of a brushless design.

Because of the axial movability of the motor shaft 54, it is necessary to provide the side guide plates 63 on the second toothed pulley 25 instead of on the first toothed pulley 23 as shown and/or the first toothed pulley 23 is then arranged axially movably relative to the motor shaft 54 on the motor shaft.

In place of the transmission 23, 25, 35, it is also possible to use a spur-gear drive for the first transmission step 41 as it is indicated in FIG. 5. A pinion 57 is arranged on the motor shaft 54, which pinion 57 cooperates with a spur gear 58 mounted on the pinion shaft 29. When the pinion 57 mates directly with the spur gear 58, both parts must have relatively large diameters (larger than the toothed pulleys 23, 25 in FIG. 2) in order to be able to bridge the center distance of the first transmission step 41. The result of this is a greater outer circle than is shown in FIG. 4. An intermediate gear 59 is therefore provided, which at the same total center distance permits smaller diameters for the pinion 57 and the spur gear 58 and as a consequence thereof a smaller outer circle similar to FIG. 4.

When the first transmission step 41 is designed as a spur-gear drive, it is possible to design the spur gear 58 in the same manner as disclosed above for the second toothed pulley 25, namely, as a braking drum of the blocking brake. When the pinion 57 is arranged on the motor shaft 54 of the sliding rotor motor 51, the pinion is wider, at least for the length of the axial movement of the motor shaft 54, than the intermediate gear 59 or the spur gear 58 mating with it in order to always remain in engagement over its entire tooth width.

Important points of the drive system of the invention, as results from the description, are:

1) The electric motor 11 or rather the sliding rotor motor 51 as arranged lies above the drive wheel 13 and transversely to the swivel bearing 17. Thus, the motor 11, 51 does not have any negative influence on the outer circle radius 38.

2) To bridge the relatively large center distance, the use of a modern HTD toothed belt is offered —aside from other means like the spur-gear drive 57, 58, 59—for the first transmission step 41. The moments still relatively low in the first step permit—in relationship to the available space—a favorable dimensioning of the toothed belt.

Further advantages of this concept are the favorable belt wrap resulting from the center distance and the possibility of varying the translation through a center distance adjustment feature which enables a use of first toothed pulleys 23 having different number of teeth so that the toothed belt 35 and the second toothed pulley remain unchanged.

3) A spur-gear drive can for the second transmission step 42 be housed within the actual gear housing 18, the pinion 30 and spur gear 31 of which are case-hardened because of the high stress.

4) The support for the drive wheel 13 can occur with an adjusted and sealed-off bearing unit (a two-row roller bearing 33) within the actual gear housing 18. This solution makes it possible to manufacture the end shield 28 space-savingly and inexpensively out of sheet metal. The driven shaft 32 can be connected to the spur gear 31 through a forced fit connection such that through this simultaneously occurs the axial fixation of the two-row bearing inner race.

5) The drum brake integrated into the second toothed pulley 25 or rather into the spur gear 58 is with respect to its function substantially a blocking brake. As a service brake, it is utilized mostly only in the lower speed range. It is engaged through operation of a spring urged structure, released through the cam 48 on the pole 15. The heat occurring during emergency braking is absorbed through the mass of the "brake drum" with the tooth system positively influencing the discharge of heat.

Further advantages of the integration of the braking mechanism into the toothed pulley 25 or rather into the spur gear 58 are: the diameter and the width of the toothed pulley are dimensioned such that the brake can be included without a negative influence on the available space, and the brake operating shaft 60 can be laterally accessible adjacent even the spur gearing, thus also without influencing the available space.

6) The swivel bearing 16 is mounted in a simple manner by the gear housing 18 and the swivel pin 17 being fastened to the undercarriage by means of screws. Design criteria for the swivel bearing 17 are the stress from the wheel load and a superposed torque load from the traction. The arrangement of the swivel bearing directly above the drive wheel 13 reduces the torque load to a minimum. The same sealed-off, adjusted bearing unit as is used for the support of the drive wheel 13 is used for the swivel bearing 16.

7) The pole bearing block 43 is mounted below the swivel bearing 17 on the gear housing 18 and is designed in one piece with same. Thus, an additional connecting part is not needed. The low hinge point for the pole 15 meets the safety requirements because the operator, due to the vertically inclined pole arrangement, cannot be clamped between an obstacle and the vehicle 1 during backward travel.

The invention permits further modifications which fall within the scope of the invention and are, therefore, to be considered as part of the patent rights.

The embodiments of the invention in which an exclusive property or privilege is claimed are defined as follows:

1. In a drive system for an undercarriage of an industrial vehicle, comprising means defining a frame, and means for pivotally mounting said frame means to said undercarriage about a vertical axis, said frame means supporting a series connected drive motor with a driven shaft, means defining a multi-step transmission and a drive wheel, and a brake means provided in said multi-step transmission means for retarding and blocking rotation of said drive wheel, a first transmission step in said multi-step transmission means including a drive member mounted on said driven shaft of said drive operatively coupled to a first drive member of a subsequent transmission step rotatably mounted on a pinion shaft mounted on said frame means, means on said frame means defining a gear housing, said multi-step transmission means including at least one transmission step located in said gear housing, said pinion shaft defining an input shaft to said at least one transmission step located in said gear housing, a second driven member forming a last transmission step of said multi-step transmission means being in the form of a horizontal driven shaft extending outwardly of said gear housing and having said drive wheel mounted thereon, and an axis of rotation of said drive motor being arranged parallel with respect to an axis of said pinion shaft and with respect to an axis of said driven shaft, the improvement wherein said first driven member is formed in the shape of a hollow braking drum of a drum brake, and wherein an interior of said hollow braking drum includes at least one brake shoe means and means supporting said brake shoe means for movement into and out of engagement with said interior of said braking drum.

2. The drive system according to claim 1, wherein said drum brake includes a means for continuously urging said brake shoe means toward said interior of said brake drum and a release means acting against said means for urging said brake shoe away from said interior of said braking drum.

3. The drive according to claim 1, wherein said at least one transmission step of said multi-step means transmission is formed by spur gears rotatably mounted in said gear housing, said gear housing containing a lubricant, a wall of said gear housing being sealingly connected to said gear housing and removable therefrom to provide access to an interior thereof, and wherein a further housing means is provided on said frame means for housing said drive member and said first driven member therein, said further housing means being free of lubricant therein and is covered by a lightweight lid fastened to at least of said one wall and frame means.

4. The drive system according to claim 1, wherein said axis of rotation of said drive motor is coplanar with said vertical axis and an axis of rotation of said drive wheel.

5. The drive system according to claim 1, wherein a radius of a theoretical cylinder encircling said frame means and said drive wheel, a centerline therefor being congruent with said vertical axis, is greater than a radius of said drive wheel by an amount that is less than one fifth (1/5) of the radius of said drive wheel.

6. The drive system according to claim 1, wherein said drive motor is an electric motor.

7. The drive system according to claim 1, wherein said direct coupling between said drive member and said driven member is by means of a drive belt.

* * * * *